(12) United States Patent
Nitto et al.

(10) Patent No.: US 11,195,255 B2
(45) Date of Patent: Dec. 7, 2021

(54) IMAGE PROCESSING APPARATUS AND METHOD OF CONTROLLING THE SAME

(71) Applicant: CANON KABUSHIKI KAISHA, Tokyo (JP)

(72) Inventors: Yuuichi Nitto, Sagamihara (JP); Mahoro Anabuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/832,573

(22) Filed: Mar. 27, 2020

(65) Prior Publication Data
US 2020/0311867 A1    Oct. 1, 2020

(30) Foreign Application Priority Data

Apr. 1, 2019   (JP) ............................. JP2019-070040

(51) Int. Cl.
*G06T 3/40*   (2006.01)
*G06T 7/11*   (2017.01)
*G06T 7/00*   (2017.01)

(52) U.S. Cl.
CPC .............. *G06T 3/40* (2013.01); *G06T 7/0004* (2013.01); *G06T 7/11* (2017.01); *G06T 2207/30132* (2013.01); *G06T 2210/36* (2013.01)

(58) Field of Classification Search
CPC ....................................................... G06T 3/40
See application file for complete search history.

(56) References Cited

U.S. PATENT DOCUMENTS

| | | | |
|---|---|---|---|
| 2007/0174790 A1* | 7/2007 | Jing ........................ | G06F 16/54 715/838 |
| 2010/0091017 A1* | 4/2010 | Kmiecik ............... | G06T 3/4038 345/420 |
| 2015/0160446 A1* | 6/2015 | Kalkbrenner ...... | G01N 21/6458 250/459.1 |
| 2016/0328591 A1* | 11/2016 | Santi ..................... | G06K 7/1408 |
| 2017/0061249 A1* | 3/2017 | Estrada ................... | G06T 5/005 |
| 2017/0108456 A1* | 4/2017 | Alizadeh .............. | G01N 27/021 |
| 2018/0198976 A1* | 7/2018 | Upendran ................. | G06T 7/50 |
| 2018/0376157 A1* | 12/2018 | Otsuka ................. | H04N 19/467 |
| 2020/0074660 A1* | 3/2020 | Oki ......................... | G06T 7/593 |
| 2020/0311931 A1* | 10/2020 | Yeh ...................... | G06K 9/4628 |

FOREIGN PATENT DOCUMENTS

| | | |
|---|---|---|
| JP | 2004318790 A | 11/2004 |
| JP | 6099479 B2 | 3/2017 |

OTHER PUBLICATIONS

Kobayashi. "Improved Projector Functions Based on System Linkage with PC", NEC Technical Journal, vol. 6, No. 3, 2011, pp. 76-77. Includes translation of p. 82 of "Improvement of Projector Function by System Cooperation with a Personal Computer", NEC Technical Journal 64(3), Aug. 2011. English translation provided. Cited in Specification.

* cited by examiner

*Primary Examiner* — Phi Hoang
(74) *Attorney, Agent, or Firm* — Rossi, Kimms & McDowell LLP

(57) ABSTRACT

In order to efficiently provide an image suitable for detecting a defect in a structure, an image processing apparatus inputs an image and a parameter for geometrically correcting the image, calculates a resolution of a corrected image obtained in a case of geometrically correcting the image using the parameter, and displays resolution information relating to the calculated resolution in association with the image.

19 Claims, 11 Drawing Sheets

FIG. 5A

| ID | REGION VERTICES |
|---|---|
| 1 | (0,0), (100,0), (100,100), (0,100) |
| 2 | (100,0), (200,0), (200,100), (100,100) |
| 3 | (200,0), (300,0), (300,100), (200,100) |
| ... | ... |
| 99 | (800,900), (900,900), (900,1000), (800,1000) |
| 100 | (900,900), (1000,900), (1000,1000), (900,1000) |

FIG. 5B

| ID | REGION VERTICES | CONVERTED REGION VERTICES |
|---|---|---|
| 1 | (0,0), (100,0), (100,100), (0,100) | (10,10), (110,12), (110,120), (9,125) |
| 2 | (100,0), (200,0), (200,100), (100,100) | (110,12), (213,16), (212,127), (110,120) |
| 3 | (200,0), (300,0), (300,100), (200,100) | (211,16), (337,10), (340,137), (212,127) |
| ... | ... | ... |
| 99 | (800,900), (900,900), (900,1000), (800,1000) | (819,944), (919,947), (921,1012), (847,1031) |
| 100 | (900,900), (1000,900), (1000,1000), (900,1000) | (919,947), (1023,957), (1031,1034), (921,1031) |

F I G. 5C

| ID | REGION VERTICES | CONVERTED REGION VERTICES | REGION RESOLUTION |
|---|---|---|---|
| 1 | (0,0), (100,0), (100,100), (0,100) | (10,10), (110,12), (110,120), (9,125) | 1.1 |
| 2 | (100,0), (200,0), (200,100), (100,100) | (110,12), (213,16), (212,127), (110,120) | 1.2 |
| 3 | (200,0), (300,0), (300,100), (200,100) | (211,16), (337,10), (340,137), (212,127) | 1.3 |
| ... | ... | ... | ... |
| 99 | (800,900), (900,900), (900,1000), (800,1000) | (819,944), (919,947), (921,1012), (847,1031) | 1.7 |
| 100 | (900,900), (1000,900), (1000,1000), (900,1000) | (919,947), (1023,957), (1031,1034), (921,1031) | 1.8 |

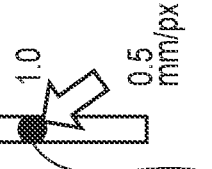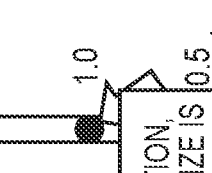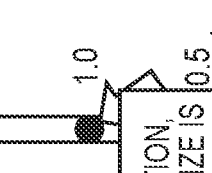

IMAGE PROCESSING APPARATUS AND METHOD OF CONTROLLING THE SAME

BACKGROUND OF THE INVENTION

Field of the Invention

The present invention relates to an image processing technique for performing ortho-correction.

Description of the Related Art

Conventionally, in the inspection of infrastructure, a report is produced by visually confirming a defect such as a crack of a structure and writing the report in a front elevation view. In contrast, in recent years, a report is produced based on captured images. In this case, first, capturing is performed from a position directly facing an inspection target surface (a wall of a structure, etc.), and a report is created by confirming the defect on an obtained captured image and writing a confirmation result. However, there is a problem where it is not necessarily possible to perform capturing from a position directly facing the inspection target surface due to the location of the structure, topographical factors, and the like.

Japanese Patent Laid-Open No. 2004-318790 (patent literature 1) discloses a technique in which a captured image is made to correspond to a point on a drawing and an image is corrected in accordance with a front elevation view. This makes it possible to obtain an image that appears to be captured from a position directly opposite regardless of the image capturing position, thereby facilitating inspection of the structure in accordance with the image. An image obtained by such a conversion is called an ortho-image, and a conversion process for obtaining an ortho-image is called ortho-correction processing. Japanese Patent No. 6099479 (patent literature 2) discloses a technique of automatically detecting a defect in accordance with image processing.

Incidentally, in the inspection of a structure by an image, since the type of a defect and the size (width, length, etc.) of the defect are specified based on the image, the resolution of the image is greatly related to the quality of inspection work. Here, the resolution of an image is an index indicating to what degree an object (structure) can be resolved in the image.

However, in the case of performing image correction as disclosed in patent literature 1, the resolution of the image after correction gets lower (coarser) the greater the distance between the actual image capturing position and the directly opposite position. As a result, it is difficult to accurately specify a defect of an image captured from an image capturing position distant from a directly opposite position. Further, in the detection processing as disclosed in patent literature 2, it is necessary to perform ortho-correction processing as preprocessing, but it is difficult to grasp whether or not the image after correction reaches a resolution necessary for performing detection processing with a predetermined accuracy. For this reason, an excessively high resolution image is often used, but there is a problem that it takes effort to capture an image at a high resolution.

SUMMARY OF THE INVENTION

According to one aspect of the present invention, an image processing apparatus, comprises: an image input unit configured to input an image; a parameter input unit configured to input a parameter for geometrically correcting the inputted image; a resolution calculation unit configured to calculate a resolution of a corrected image obtained in a case of geometrically correcting the inputted image using the inputted parameter; and a display unit configured to display resolution information relating to the calculated resolution in association with the inputted image.

The present invention makes it possible to efficiently grasp whether or not an inputted image is suitable for detecting a defect in a structure.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A through 5C are views that exemplarily illustrate a configuration of various pieces of data.

FIGS. 7A to 7D are views that exemplarily illustrate screens displayed on a display device.

DESCRIPTION OF THE EMBODIMENTS

Figure 1:
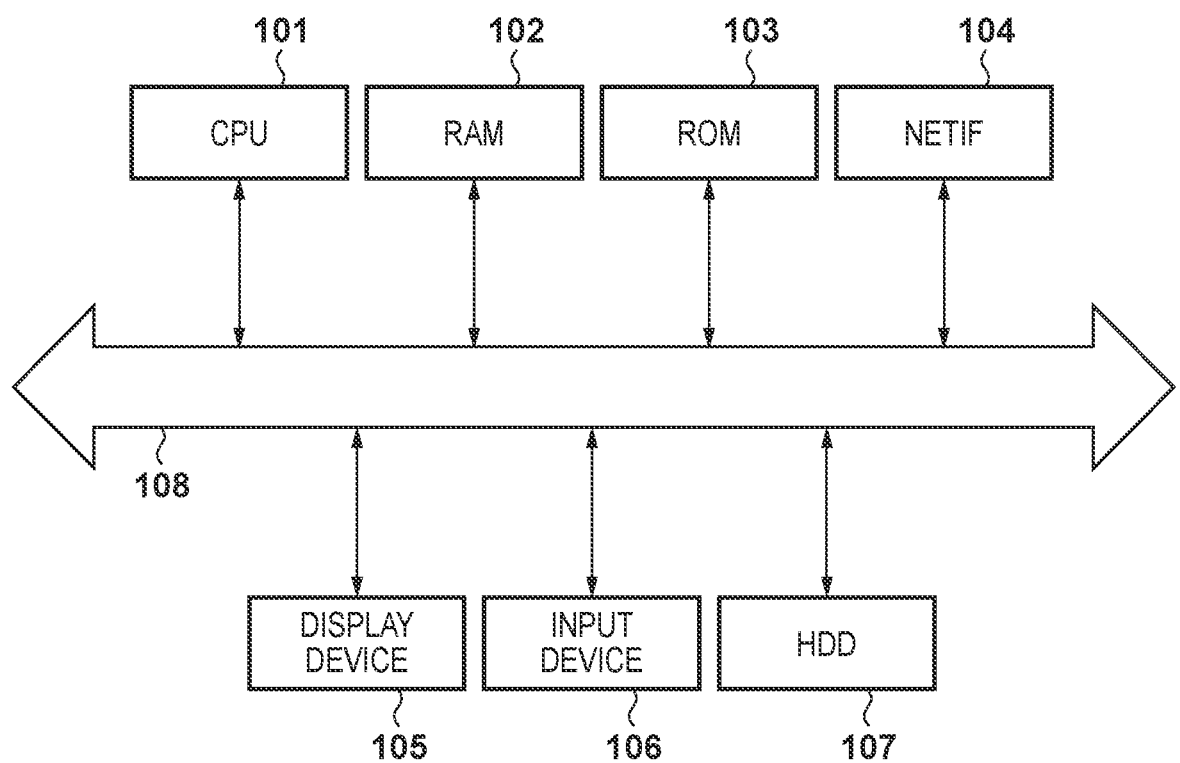
FIG. 1 is a diagram showing a hardware configuration of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

As a first embodiment of an image processing apparatus according to the present invention, an image processing apparatus which generates an ortho-image as a corrected image from a captured image of a structure and executes defect detection on the ortho-image will be described below as an example.

Apparatus Configuration

FIG. 1 is a diagram showing a hardware configuration of an image processing apparatus according to a first embodiment. Although FIG. 1 shows an aspect in which the image processing apparatus is configured by one apparatus, the image processing apparatus may be configured by a plurality of apparatuses.

A central processing unit (CPU) 101 is in charge of control of the computer system. The CPU 101 executes calculation and processing of information and control of hardware based on control programs, thereby realizing functional configurations and processing to be described later. A random access memory (RAM) 102 functions as a main memory of the CPU 101 and as a work memory required for loading an execution program and executing the program. A read only memory (ROM) 103 stores control programs for defining CPU 101 operation processing procedures. The ROM 103 includes a program ROM in which base software (OS), which is a system program for controlling devices of a computer system, is recorded, and a data ROM in which information required for operating the system is recorded. Instead of the ROM 103, an HDD 107 described later may be used.

A network interface (NETIF) 104 controls input/output of data transmitted/received via a network. A display device 105 is, for example, a CRT display, a liquid crystal display, or the like. An input device 106 is, for example, a touch panel, a keyboard, a mouse, or the like and is for accepting an operation instruction from a user. The hard disk drive (HDD) 107 is a storage device. The HDD 107 is used for storing data such as application programs. An input/output bus 108 is a bus (address bus, data bus, and control bus) for connecting the above-described units.

Figure 2:
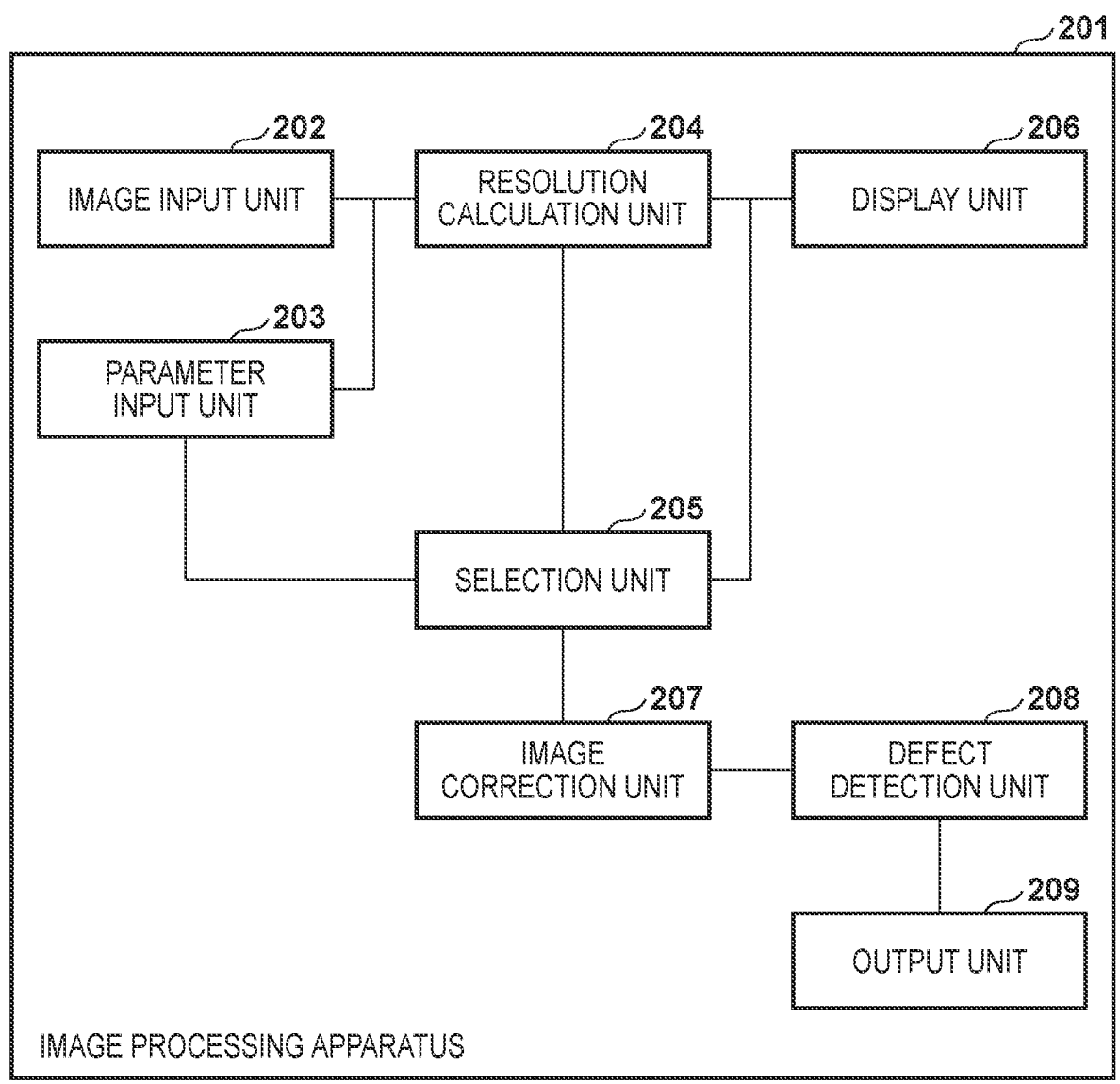
FIG. 2 is a diagram showing a functional configuration of the image processing apparatus according to the first embodiment.

FIG. 2 is a diagram showing a functional configuration of the image processing apparatus according to the first embodiment. As will be described in detail later, an image processing apparatus 201 generates an ortho-image from a captured image of a structure, and executes defect detection on the ortho-image. In particular, it has a function of quantitatively displaying a change in resolution that occurs when an inputted captured image is converted into an ortho-image.

An image input unit 202 reads, from the NETIF 104 or the HDD 107, an image that is to be a processing target. A parameter input unit 203 is inputted with a parameter for geometrically correcting the image via the input device 106. Here, geometrically correcting assumes ortho-correction.

A resolution calculation unit 204 calculates the resolution of the corrected image based on the image read by the image input unit 202 and the parameter inputted by the parameter input unit 203. In the following description, the image is divided into a plurality of partial regions, and the resolution of the corrected image is calculated for each partial region. A selection unit 205 selects a region to be a correction target and an output resolution based on the parameter inputted by the parameter input unit 203 and the resolution calculated by the resolution calculation unit 204.

A display unit 206 displays various information related to image correction on the display device 105. Here, display is performed for a process of selecting an output resolution and a target range to be ortho-corrected from out of the inputted captured image. The detail will be described later by referring to FIGS. 7A to 7D. An image correction unit 207 corrects the image based on the target range and the output resolution selected by the selection unit 205. A defect detection unit 208 detects a defect from the image corrected by the image correction unit 207. An output unit 209 vectorizes the defect detected by the defect detection unit 208, for example, and outputs the vector.

Operation of the Apparatus

Figure 3:
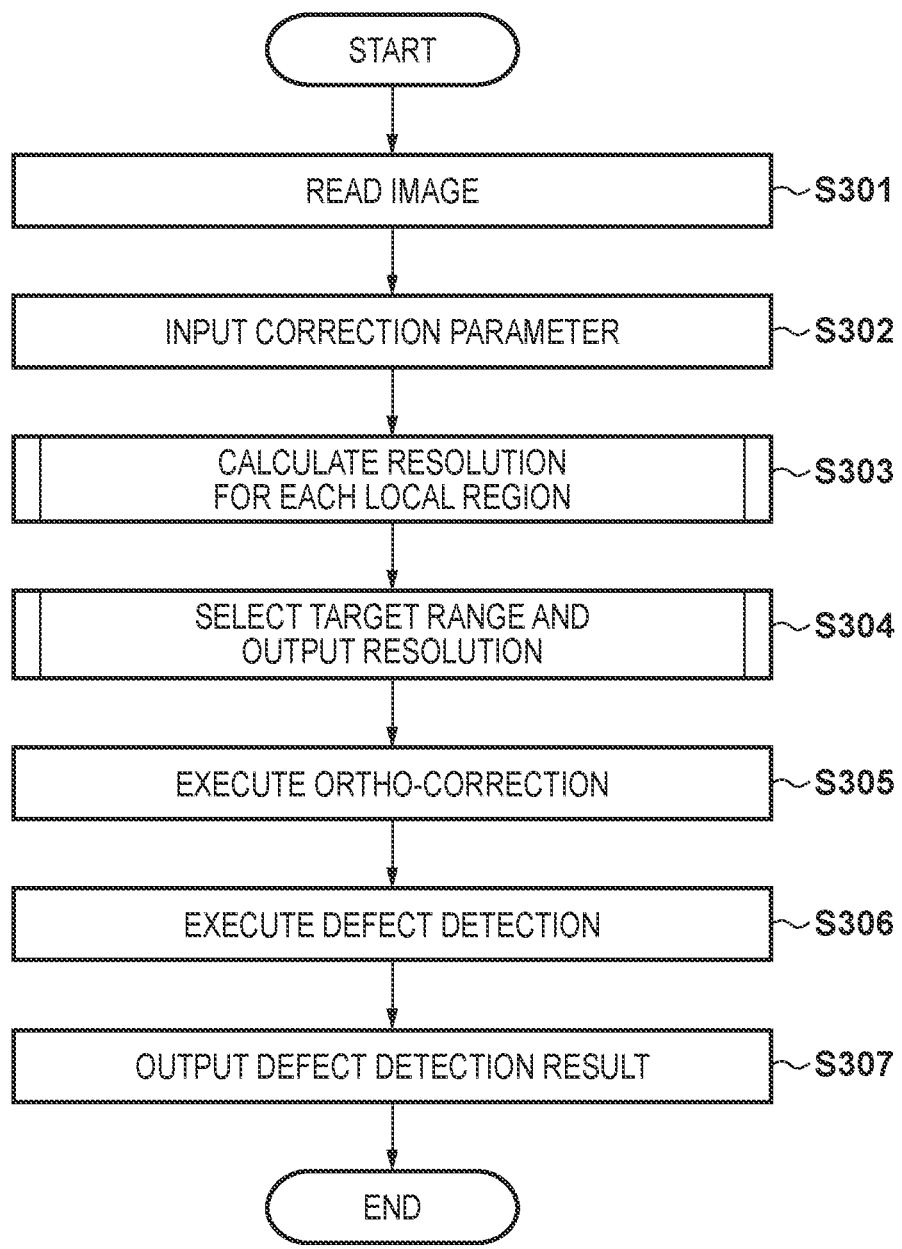
FIG. 3 is an overall flowchart of image processing in the first embodiment.

FIG. 3 is an overall flowchart of image processing in the first embodiment.

In step S301, the image input unit 202 reads an image. The image inputted here is an image obtained by capturing a wall surface of a concrete structure that is an inspection target, and in particular, an image obtained by tilted capturing from a position distant from the concrete structure. Alternatively, a plurality of images obtained by dividing one structure into a plurality of regions and capturing the regions may be stitched together to make a single image. For example, the image input unit 202 reads an image designated in advance by the user.

In step S302, the parameter input unit 203 inputs a parameter for ortho-correcting the image read in step S301. Various ortho-correction parameters are available and there is no limitation to any particular one. For example, when the method disclosed in the literature "Reichi Kobayashi, Eiichi Ishii, "Improvement of Projector Function by System Cooperation with a Personal Computer", NEC Technical Journal 64(3), 80-83, August 2011" is used, a homography matrix H and an initial value $r_{base}$ of the output resolution are input.

As disclosed in patent literature 1, the homography matrix H may be calculated after the user designates a pair of corresponding points between coordinates on drawing data and coordinates on the image. The initial value $r_{base}$ of the output resolution may be the resolution of the drawing data. In the following explanation, "mm/px" is assumed as a unit of resolution. That is, it is assumed that the resolution represents a length on the structure surface corresponding to one pixel of the image, and represents that the smaller the value, the finer the resolution.

Figure 4:
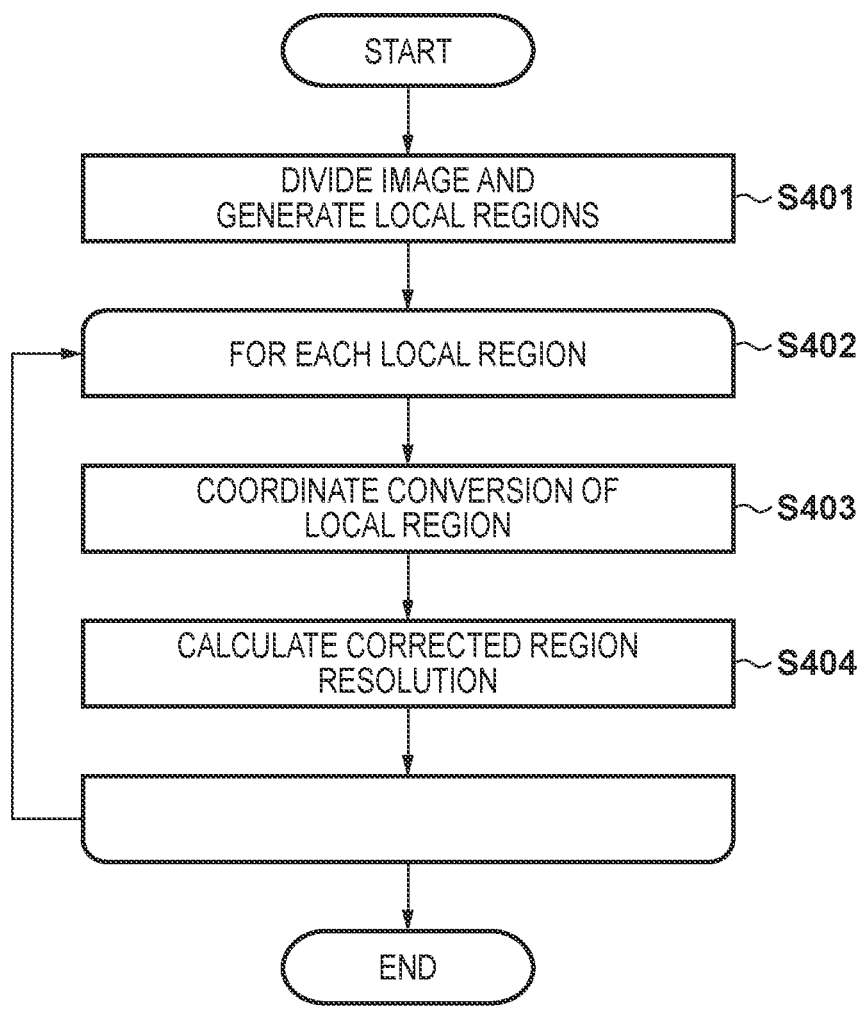
FIG. 4 is a detailed flowchart of a calculation process (step S303).

In step S303, the resolution calculation unit 204 calculates the resolution of each region after ortho-correction (hereinafter, referred to as region resolution). FIG. 4 is a detailed flowchart of a calculation process (step S303). FIGS. 5A to 5C are diagrams exemplarily showing the configuration of the data outputted in respective steps of FIG. 4.

In step S401, the resolution calculation unit 204 divides the inputted image by a predetermined unit to generate a plurality of local regions. For example, when an input image of 1000×1000 pixels is divided into local regions each having 100×100 pixels in a grid-like manner, local region information 501 shown in FIG. 5A is generated.

The local region information 501 is information that defines a plurality of local regions obtained by division, and includes an ID 502 that is an index of a local region, and region vertices 503 that is a vertex coordinate group that forms the local region. Here, since a local region is a rectangular region of 100×100 pixels, information corresponding to coordinates of four vertices is stored in the region vertices 503. The method of division into local regions is not limited to a grid shape, and division may be performed with any shape.

In step S402, the resolution calculation unit 204 selects one of the local regions generated in step S401, and performs the processing of step S403 and step S404. In step S403, the resolution calculation unit 204 executes a region conversion process on the local region selected in step S402 using the parameters. The region conversion processing here is processing for converting coordinates p of each vertex representing the local region into coordinates q using the homography matrix H. The conversion can be represented by, for example, the following Equation (1).

$$q = Hp \quad (1)$$

FIG. 5B shows the converted local region information 504. Here, illustration is given for a case where converted region vertices 505 are added to the local region information 501. The converted region vertices 505 are a vertex coordinate group that forms a converted local region.

In step S404, the resolution calculation unit 204 calculates the corrected region resolution using the pre-conversion local region and the converted local region obtained in step S403. For example, when the vertex group of the i-th local region is Pi and the vertex group after conversion is Qi, the region resolution $r_i$ can be obtained using the following Equation (2).

$$r_i = \frac{r_{base}}{d(P_i, Q_i)} \quad (2)$$

Here, d(Pi, Qi) is a function for calculating a transformation ratio of the local region, and outputs, for example, a region area ratio for before and after conversion. There is no limitation to a function for calculating the transformation ratio, and there may be a region circumference ratio before and after the deformation, a ratio average of the length of each corresponding side, a Hausdorff distance after normalizing each vertex, or the like.

FIG. 5C illustrates local region information 506 for which region resolutions have been calculated. Here, illustration is given for a case where region resolutions 507 are added to the converted local region information 504. As described above, the region resolutions 507 are calculated for respective local regions based on the region vertices 503 and the converted region vertices 505.

In step S304, the selection unit 205 selects the target range to be corrected and the final output resolution. The selection unit 205 selects a target range and an output resolution based on, for example, interaction with a user via a graphical user interface (GUI).

Figure 6:
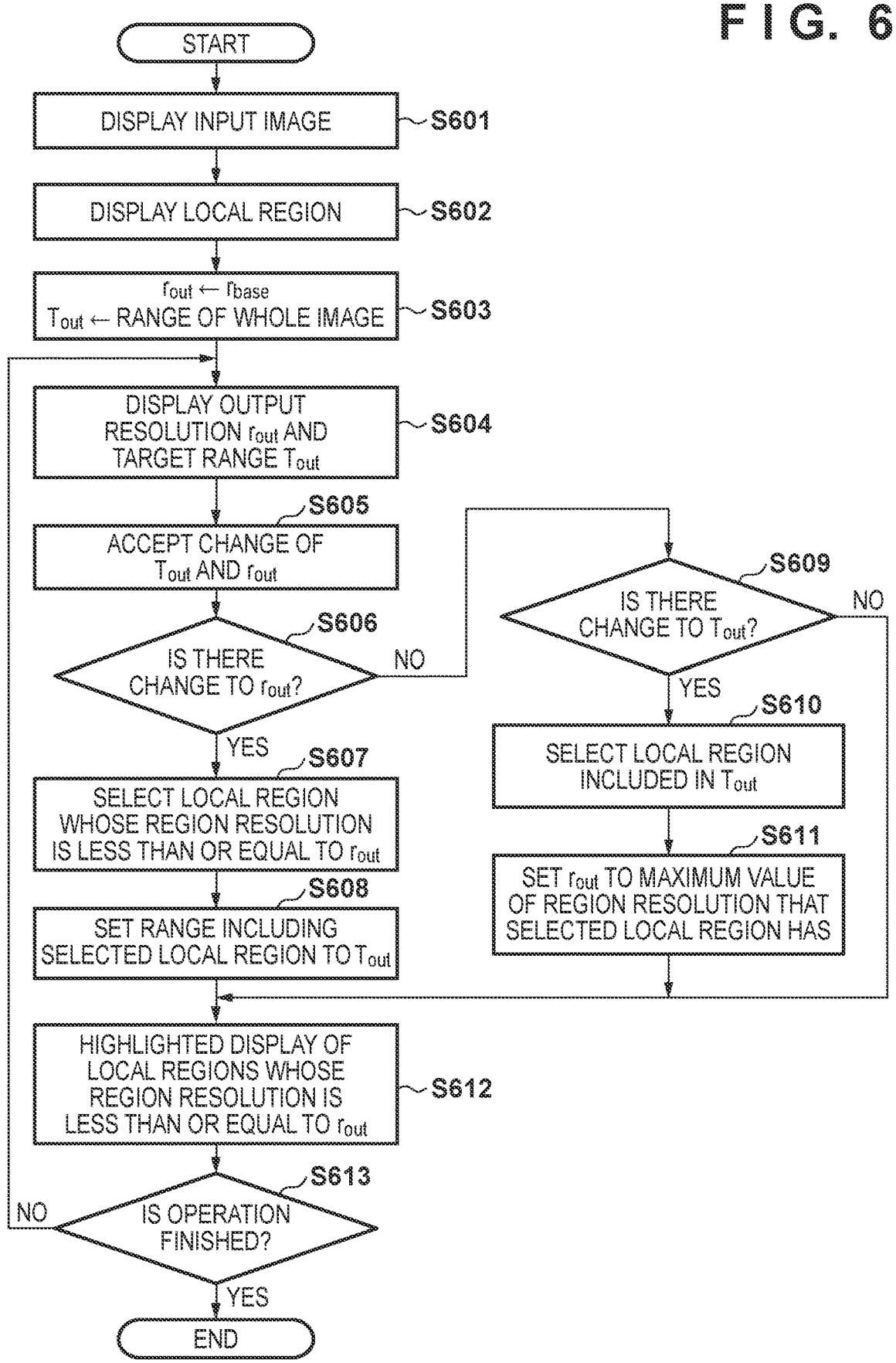
FIG. 6 is a detailed flowchart of a selection process (step S304).

FIG. 6 is a detailed flowchart of a selection process (step S304). FIGS. 7A to 7D are diagrams exemplarily showing screens displayed on a display device in the selection process (step S304).

In step S601, the selection unit 205 performs control to display the image inputted by the image input unit 202 on the display unit 206. In step S602, the selection unit 205 performs a superimposed display of the local region and the region resolution outputted from the resolution calculation unit 204 on the image displayed in step S601.

FIG. 7A exemplarily shows a GUI displayed in step S602. Here, a grid 702 indicating a local region and a region resolution 703, which is resolution information of the local region, are superimposed and displayed on the inputted image 701. Here, an example in which a 6×6 local region out of 10×10 local regions obtained by the division is displayed is shown. More specifically, the grid 702 representing each local region is displayed based on the region vertices 503, and the region resolution 703 of each local region is displayed based on the region resolution 507. In this manner, by displaying the corresponding region resolutions in association with the local regions, the user can easily grasp the state of the resolution of each local region after conversion.

In step S603, the selection unit 205 designates initial values for the target range $T_{out}$ and the output resolution $r_{out}$ in the image to be ortho-corrected. Here, $T_{out}$=the range of the whole image and $r_{out}=r_{base}$. In step S604, the selection unit 205 displays the currently designated target range Tout and the output resolution $r_{out}$.

FIG. 7B exemplarily shows a GUI displayed in step S604. Here, examples are shown in which the target range $T_{out}$ and the output resolution $r_{out}$ are accepted as a target range adjustment frame 704 and an output resolution adjustment control 705, respectively, with respect to FIG. 7A. The output resolution adjustment control 705 is a slider-type GUI control component that enables instruction of any value within a predetermined range (in the case of FIG. 7B, the range of 0.5 mm/px to 4.0 mm/px).

In step S605, the selection unit 205 accepts a change of the target range $T_{out}$ and the output resolution $r_{out}$ from the user. For example, adjustment of the position and size of the target range adjustment frame 704 shown in FIG. 7B is accepted from the user via a keyboard or mouse operation or the like, and thereby a change of the target range $T_{out}$ is accepted. Further, adjustment of the output resolution adjustment control 705 is accepted from the user via a keyboard or mouse operation or the like, and thereby a change of the output resolution $r_{out}$ is accepted.

In step S606, the selection unit 205 confirms whether or not the output resolution $r_{out}$ has been changed, and proceeds to step S607 when the output resolution has been changed, or proceeds to step S609 when the output resolution has not been changed.

In step S607, the selection unit 205 selects local regions having a region resolution finer (=a higher region resolution) than the output resolution $r_{out}$. For example, the region resolution 507 shown in FIG. 5C is confirmed, and local regions having a region resolution finer than the output resolution $r_{out}$ (that is, less than or equal to $r_{out}$) are selected.

In step S608, the selection unit 205 generates a range including the local region selected in step S607, and sets the range as the target range $T_{out}$. Here, a range that includes the selected local region may be a polygonal region which is a sum of the local regions. It may also be a maximum rectangle inscribed in the selected local region or a minimum rectangle the circumscribes the selected local region.

In step S609, the selection unit 205 confirms whether or not a user has changed the target range $T_{out}$, and proceeds to step S610 when the target range $T_{out}$ has been changed, or proceeds to step S612 when the target range $T_{out}$ has not been changed.

In step S610, the selection unit 205 selects local regions included in the changed target range $T_{out}$. Here, as the local regions included in the range, local regions in which the region designated by the region vertices 503 intersect the target range $T_{out}$ may be selected, or only included local regions may be selected.

In step S611, the selection unit 205 sets the coarsest value (in other words, the largest value) of the region resolution 507 shown in FIG. 5C to $r_{out}$ for the local region selected in step S610.

In step S612, the selection unit 205 performs a highlighted display of local regions having a region resolution finer than the output resolution $r_{out}$ (in other words, less than or equal to $r_{out}$). For example, as shown in FIG. 7C, a local region having a region resolution finer than the output resolution $r_{out}$ (in other words, a region in which a desired output resolution is satisfied when an ortho-image is generated) is set to a hatching display 706. It should be noted that any display capable of identifying between a region finer than the output resolution $r_{out}$ and a region coarser than the output resolution can be used, and any highlighted display can be used. When a local region having a region resolution coarser than the output resolution $r_{out}$ is included in the target range adjustment frame 704, a warning display 707 as shown in FIG. 7D may be performed. At this time, the size ratio 708 may be displayed based on the coarsest-value $r_{course}$ of the region resolution because $r_{coarse}/r_{out}$ is the size ratio of the input image required when correcting by the output resolution $r_{out}$.

In step S613, the selection unit 205 confirms whether the target selection operation is completed, and repeatedly executes step S604 to step S612 until the target selection operation is completed.

By the above operation, the selection unit 205 determines the target range $T_{out}$ of the image to be ortho-corrected and the final output resolution $r_{out}$ of the image based on user interaction via the GUI.

In step S305, the image correction unit 208 executes ortho-correction based on the target range $T_{out}$ and the output resolution $r_{out}$ determined in step S304. First, a coordinate transformation matrix H' used for ortho-correction of images is obtained by using Equation (3) based on the homography matrix H inputted in step S302, the initial value $r_{base}$ of the output resolution, and the output resolution $r_{out}$ determined in step S304.

$$H' = \begin{pmatrix} r_{base}/r_{out} & 0 & 0 \\ 0 & r_{base}/r_{out} & 0 \\ 0 & 0 & 1 \end{pmatrix} H \quad (3)$$

Next, pixels in the image included in the target range $T_{out}$ determined in step S304 are mapped by the coordinate transformation matrix H' to generate an ortho-image.

In step S306, the defect detection unit 208 detects a defect from the ortho-image generated in step S305. Note that a method of detecting a defect is not limited to a specific method. For example, edge-detection using Sobel filtering or the like can be used as a method of detecting cracks on a concrete structure surface. At this time, the output resolution $r_{out}$ outputted in step S304 may be used as a parameter for edge-detection or the like.

In step S307, the output unit 209 vectorizes the result of detecting the defect in step S306 and outputs the vectorized result. For example, contour extraction processing is performed based on the edge detection result outputted from step S306, and a closed segment surrounded by the extracted contour is vectorized by elliptical approximation or the like. The ortho-image outputted in step S305 may also be outputted.

As described above, according to the first embodiment, the degree of resolution reduction accompanying ortho-correction processing is quantitatively displayed. As a result, the user can recognize whether or not an ortho-image can be generated at a desired output resolution. In other words, it is possible to efficiently grasp whether or not an inputted image is suitable for detecting a defect in a structure. Further, when an ortho-image is generated based on the current input image, the user can find out in advance a region having a resolution sufficient for defect detection. Further, it is possible to confirm a size ratio of an input image necessary to generate an ortho-image that satisfies a desired output resolution. As a result, it becomes unnecessary to use an excessively high-resolution input image as in the conventional case, and it becomes possible to more efficiently provide an ortho-image suitable for performing defect detection.

For example, when the present embodiment is implemented by an application installed in a portable PC, the above-mentioned information can be confirmed even at a capturing site. For example, for an image obtained by capturing at least a part of a structure under certain capturing conditions, according to the present embodiment, it is possible to confirm whether or not an ortho-image satisfying a desired output resolution is possible. According to the present embodiment, since it is possible to determine at an early stage whether or not a capturing condition should be changed, it is possible to reduce the effort for redoing the capturing.

Second Embodiment

In the second embodiment, an image processing apparatus according to another aspect for generating an ortho-image and performing defect detection will be described. In the first embodiment, the ortho-correction is performed in one batch with respect to the target range set for the input image, and defect detection is performed with respect to a generated ortho-image. In contrast, in the second embodiment, the image is ortho-corrected for each local region, defect detection is performed with respect to the ortho-image for each local region, and the defect detection results for each local region are integrated (stitched together) and outputted.

Apparatus Configuration

Figure 8:
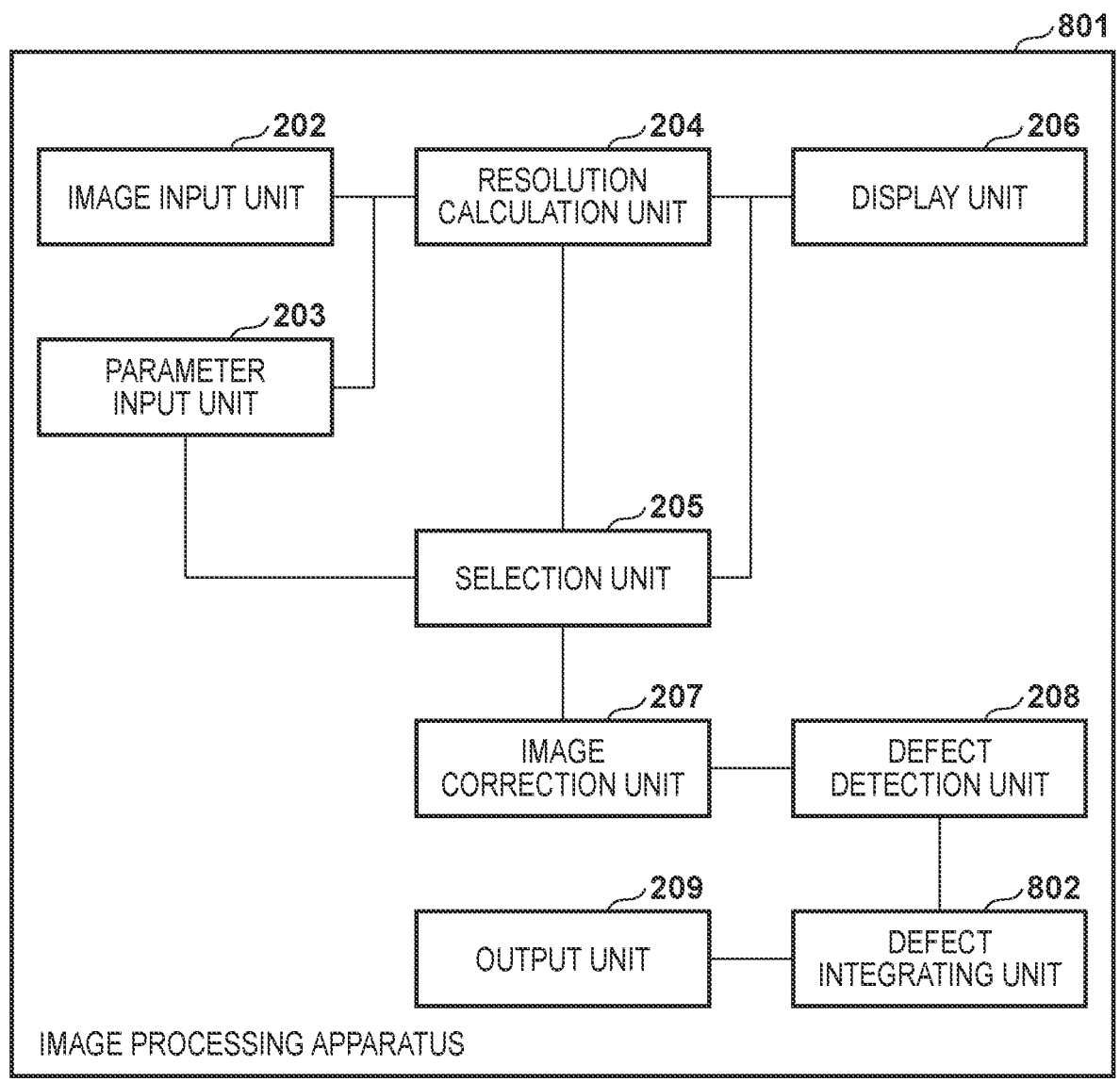
FIG. 8 is a diagram showing a functional configuration of an image processing apparatus according to a second embodiment.

FIG. 8 is a diagram showing a functional configuration of an image processing apparatus according to the second embodiment. A defect integrating unit 802 is further added to the functional configuration of the first embodiment (FIG. 2). The defect integrating unit 802 integrates the detection results of the defect detection executed by the defect detection unit 208 for each local region. The detailed operation will be described later.

Operation of Apparatus

Figure 9:
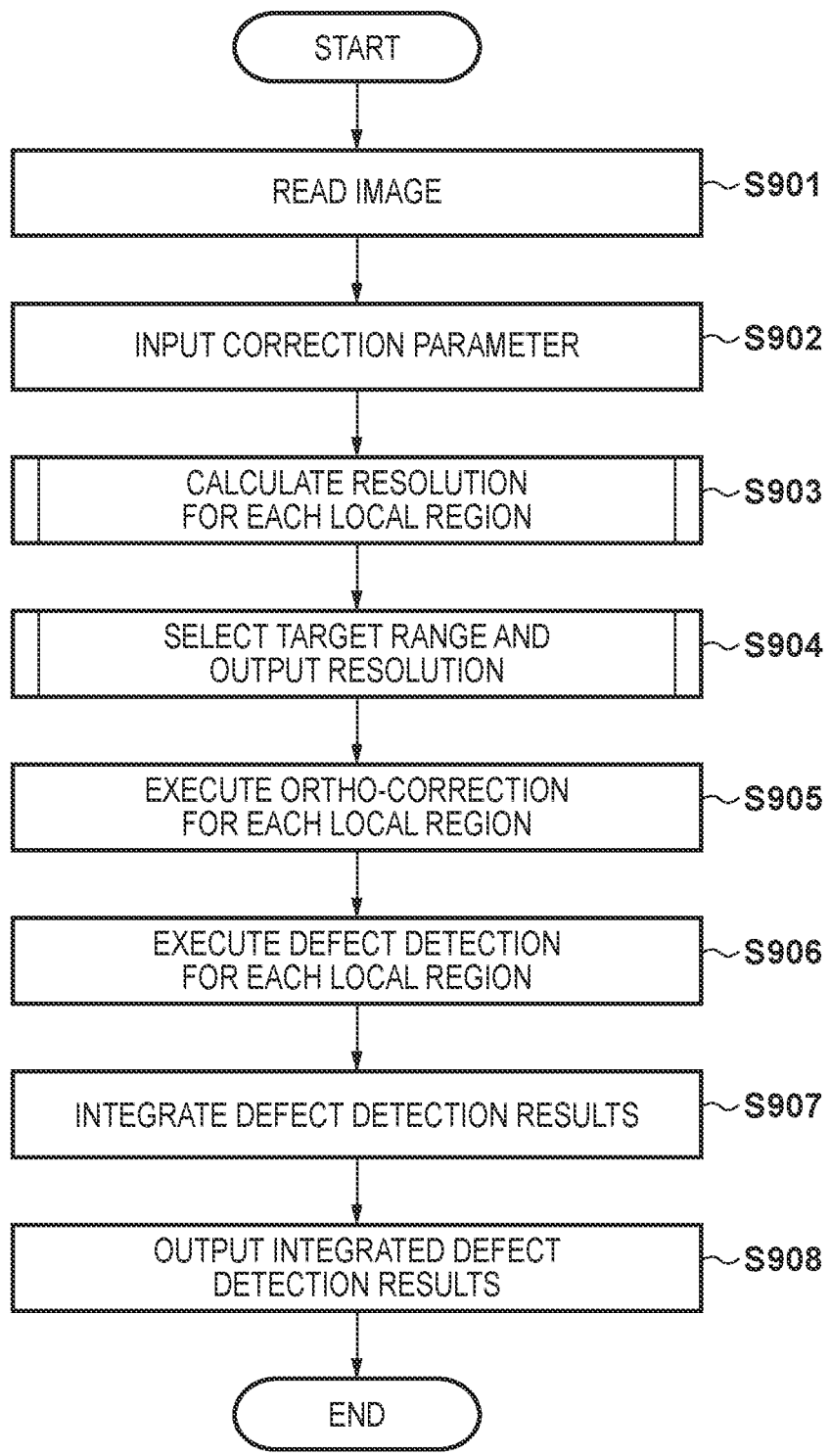
FIG. 9 is an overall flowchart of image processing in the second embodiment.

FIG. 9 is an overall flowchart of image processing in the second embodiment. Processing of step S901 to S904 is the same as that in step S301 to step S304 of the first embodiment, and therefore descriptions thereof are omitted. The processing of step S904 may be omitted. In this instance, it is preferable to set the entire image as the target range $T_{out}$, and to set the initial value $r_{base}$ of the output resolution designated in step S902 as the output resolution $r_{out}$.

In step S905, the image correction unit 208 executes ortho-correction for each local region. Here, it is assumed that execution is performed for only K local regions corresponding to the target range $T_{out}$ determined in step S904. As the K local regions, local regions intersecting with the target range $T_{out}$ may be selected, or only local regions included in the target range $T_{out}$ may be selected. Note that, when the processing of step S904 is omitted, the processing of step S905 is executed on all the local regions of the input image.

First, a coordinate transformation matrix $H_i'$ used for ortho-correction of each local region is obtained by using Equation (4), based on the homography matrix H inputted in step S902, the initial value $r_{base}$ of the output resolution, and the region resolution $r_i$ for each local region outputted in step S903.

$$H'_i = \begin{pmatrix} r_{base}/r_i & 0 & 0 \\ 0 & r_{base}/r_i & 0 \\ 0 & 0 & 1 \end{pmatrix} H \quad (4)$$

Next, the pixels in the image included in the pre-converted local region outputted from step S903 are mapped by the coordinate transformation matrix $H'_i$ to generate an ortho-image which is a partial corrected image for each local region.

In step S906, the defect detection unit 208 detects a defect from the ortho-image of each local region generated in step S905. The method of detecting a defect may be the method described in the first embodiment or a method that uses machine learning and is described below. That is, a training model for each resolution is created by training in advance, by a neural net or the like, defect information and images that are close in resolution. Then, based on the region resolution $r_i$ outputted from step S903, it is appropriate to select a training model whose image resolution is close and perform defect detection.

In step S907, the defect integrating unit 802 integrates the defect detection results for each local region detected in step S906. For example, each defect detection result outputted in step S906 is treated as an image, converted into an output resolution $r_{out}$, and integrated together as one image.

Figure 10:
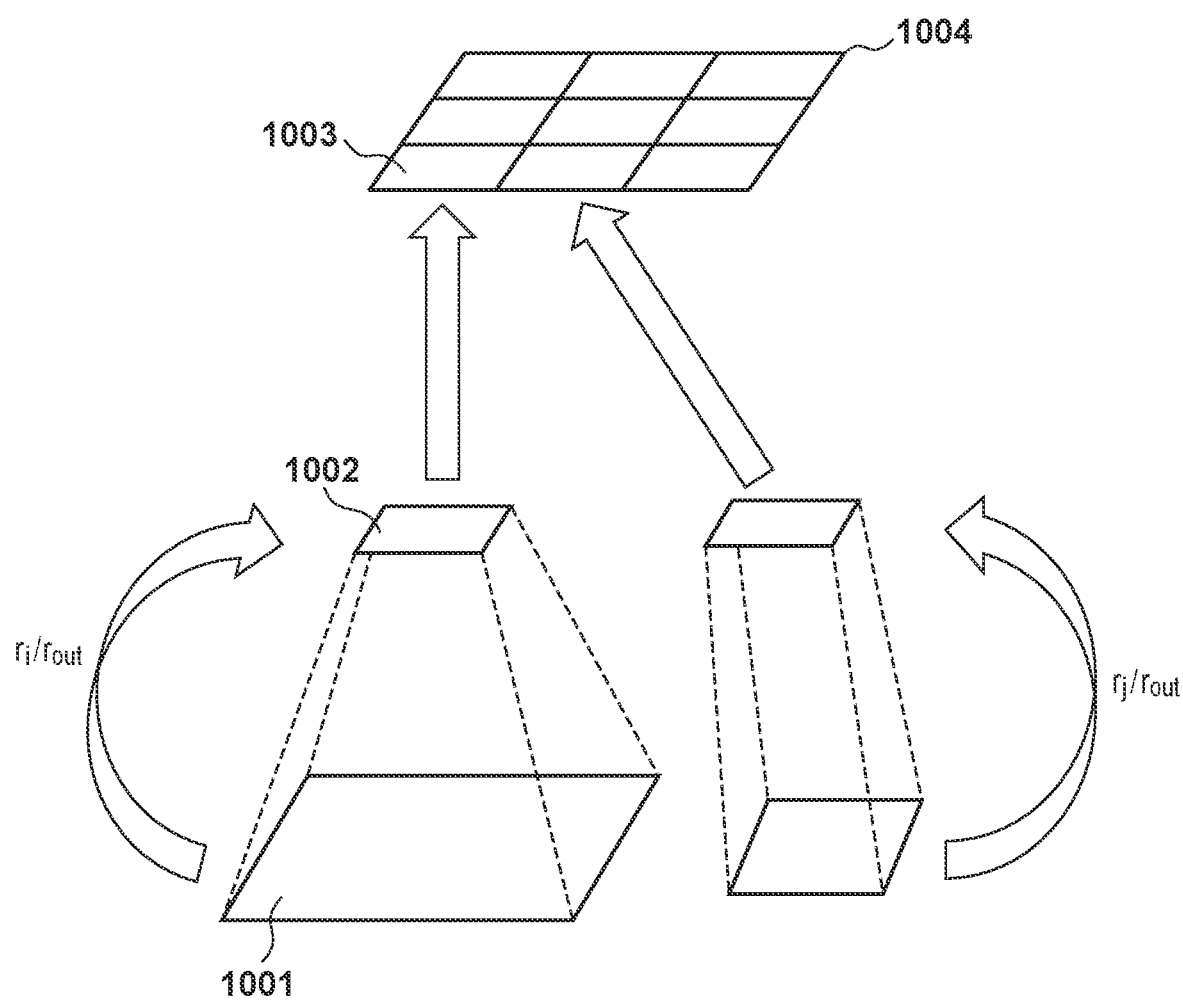
FIG. 10 is a diagram for describing integration processing (step S907).

FIG. 10 is a diagram for describing integration processing (step S907). First, using the region resolution $r_i$, the defect detection result 1001 of the i-th local region is scaled by a $r_i/r_{out}$ factor. A defect detection result 1002 obtained by scaling is arranged in the region 1003 corresponding to the i-th local region. This processing is executed on K local regions and integrated as one defect detection result 1004. In step S908, the output unit 209 vectorizes the integrated defect detection results that were generated in step S907, and outputs the vectorized results. This process is the same as that of the first embodiment (S307), and therefore the explanation thereof is omitted.

As described above, according to the second embodiment, ortho-correction and defect detection processing are performed for each local region. As a result, it is possible to generate an ortho-image with higher accuracy as compared with the first embodiment with respect to the same input image, and it is possible to perform defect detection processing with higher accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-070040, filed Apr. 1, 2019, which is hereby incorporated by reference herein in its entirety.

What is claimed is:

1. An image processing apparatus comprising:
one or more processors functioning as:
an image input unit configured to input an image;
a parameter input unit configured to input a parameter for geometrically correcting the input image;
a resolution determining unit configured to determine resolutions obtained in a case of geometrically correcting a plurality of partial regions of the input image using the input parameter;
a display control unit configured to display resolution information relating to the determined resolutions in association with the input image; and
a selection unit configured to, based on the resolutions determined for the plurality of partial regions, select a target range, from among the plurality of partial regions, to be a target of the geometric correction and a resolution of a partial region corresponding to the target range.

2. The image processing apparatus according to claim 1, wherein:
the one or more processors further functions as a dividing unit configured to divide the input image into the plurality of partial regions,
the resolution determination unit determines a resolution for each of the plurality of partial regions, and
the display control unit displays the resolution information for each of the plurality of partial regions.

3. The image processing apparatus according to claim 1, wherein:
the one or more processors further function as a first acceptance unit configured to accept an output resolution from a user,
the selection unit selects a range that includes one or more partial regions satisfying the output resolution from the plurality of partial regions as the target range.

4. The image processing apparatus according to claim 3, wherein:
the first acceptance unit accepts an output resolution designated by using a slider-type user interface, and
the display control unit displays the input image in a state in which the plurality of partial regions can be identified, and further clearly indicates one or more partial regions selected as the target range.

5. The image processing apparatus according to claim 3, wherein:
the one or more processors further function as a second acceptance unit configured to accept a change of the target range from a user,
the selection unit selects, as the resolution of the corrected image, a coarsest resolution among the resolution determined by the resolution determining unit for the one or more partial regions included in the changed target range.

6. The image processing apparatus according to claim 3, wherein the display control unit identifiably displays a partial region satisfying the output resolution and a partial region not satisfying the output resolution.

7. The image processing apparatus according to claim 3, wherein the display control unit displays a warning when a partial region that does not satisfy the output resolution is included in the target range.

8. The image processing apparatus according to claim 7, wherein the display control unit indicates, as the warning, a condition required for an image to be input by the image input unit in order for the target range to satisfy the output resolution.

9. The image processing apparatus according to claim 1, wherein the one or more processors further function as an image correction unit configured to geometrically correct an image of the target range based on the input parameter and the selected resolution to generate the corrected image.

10. The image processing apparatus according to claim 9, wherein:
the input image is a captured image of a structure,
the image processing apparatus further comprises a detection unit configured to detect a defect of the structure from the corrected image.

11. The image processing apparatus according to claim 10, wherein:
the structure is a concrete structure, and
the defect of the concrete structure includes at least a crack that has occurred on the surface of the concrete structure.

12. The image processing apparatus according to claim 9, wherein:
the input image is a captured image of a structure,
the image correction unit geometrically corrects, based on the input parameter and the resolution determined for each of one or more partial regions included in the target range, an image of each of the one or more partial regions and generates one or more partial corrected images,
the image processing apparatus further comprises:
a detection unit configured to detect a defect of the structure from each of the one or more partial corrected images; and
a defect integration unit configured to integrate the detected defects respectively corresponding to the one or more partial corrected images.

13. The image processing apparatus according to claim 12, wherein:
the structure is a concrete structure, and
the defect of the concrete structure includes at least a crack that has occurred on the surface of the concrete structure.

14. The image processing apparatus according to claim 1, wherein:
the geometric correction is ortho-correction, and
the parameter comprises a homography matrix.

15. The image processing apparatus according to claim 1, wherein:
the image input by the image input unit is an image obtained by tilted capturing of a structure,
the geometric conversion is a process of converting the image into an image that appears to be captured from a position directly opposite the structure.

16. The image processing apparatus according to claim 15, wherein the image input by the image input unit is an image obtained by stitching together, into one image, a plurality of images obtained by dividing one structure into a plurality of regions and capturing the respective regions.

17. A method of controlling an image processing apparatus, the method comprising:
inputting an image;
inputting a parameter for geometrically correcting the input image;
determining resolutions obtained in a case of geometrically correcting a plurality of partial regions of the input image using the input parameter;
displaying, on a display unit, resolution information relating to the determined resolutions in association with the input image; and
selecting, based on the resolutions determined for the plurality of partial regions, a target range, from among the plurality of partial regions, to be a target of the geometric correction and a resolution of a partial region corresponding to the target range.

18. A non-transitory computer-readable recording medium storing a program executable by a computer to execute a method comprising:
inputting an image;
inputting a parameter for geometrically correcting the input image;
determining resolutions obtained in a case of geometrically correcting a plurality of partial regions of the input image using the input parameter;
displaying, on a display unit, resolution information relating to the determined resolutions in association with the input image; and
selecting, based on the resolutions determined for the plurality of partial regions, a target range, from among the plurality of partial regions, to be a target of the geometric correction and a resolution of a partial region corresponding to the target range.

19. An image processing apparatus comprising:
one or more processors function as:
an image input unit configured to input an image;
an acceptance unit configured to accept an output resolution condition from a user;
a parameter input unit configured to input a parameter for geometrically correcting the input image;
a resolution determination unit configured to determine a resolution obtained in a case of geometrically correcting each of a plurality of partial regions of the input image using the input parameter; and
a display control unit configured to display a warning when a partial region that does not satisfy the output resolution condition is included in the input image.

* * * * *